(12) United States Patent
Crane et al.

(10) Patent No.: US 11,939,849 B2
(45) Date of Patent: Mar. 26, 2024

(54) SYSTEM AND METHOD FOR A MECHANICAL SHAFT LOCK ON AN ELECTRIC SUBMERSIBLE PUMP

(71) Applicant: EXTRACT MANAGEMENT COMPANY, LLC, Tulsa, OK (US)

(72) Inventors: Mitchell Lee Crane, Tulsa, OK (US); Jose Mauricio Oviedo Gualdron, Tulsa, OK (US)

(73) Assignee: Extract Companies, LLC, Tulsa, OK (US)

( * ) Notice: Subject to any disclaimer, the term of this patent is extended or adjusted under 35 U.S.C. 154(b) by 0 days.

(21) Appl. No.: 17/973,366

(22) Filed: Oct. 25, 2022

(65) Prior Publication Data

US 2023/0128922 A1 Apr. 27, 2023

Related U.S. Application Data

(60) Provisional application No. 63/271,293, filed on Oct. 25, 2021.

(51) Int. Cl.
| | | |
|---|---|---|
| *E21B 43/12* | (2006.01) | |
| *F04D 1/06* | (2006.01) | |
| *F04D 13/08* | (2006.01) | |
| *F04D 25/06* | (2006.01) | |
| *F04D 29/044* | (2006.01) | |
| *F04D 29/62* | (2006.01) | |
| *F16D 9/06* | (2006.01) | |

(52) U.S. Cl.
CPC .............. *E21B 43/128* (2013.01); *F04D 1/06* (2013.01); *F04D 13/086* (2013.01); *F04D 25/0606* (2013.01); *F04D 25/0686* (2013.01); *F04D 29/044* (2013.01); *F04D 29/628* (2013.01); *F16D 9/06* (2013.01)

(58) Field of Classification Search
CPC ........ E21B 43/128; F04D 1/06; F04D 13/086; F04D 25/0606; F04D 25/0686; F04D 29/044; F04D 29/628; F16D 9/06
USPC .......................................... 417/319; 188/265
See application file for complete search history.

(56) References Cited

U.S. PATENT DOCUMENTS

| | | | |
|---|---|---|---|
| 4,604,035 A | | 8/1986 | Roberts |
| 4,621,982 A | * | 11/1986 | Schulz .................... F04C 14/28 417/319 |
| 2005/0199384 A1 | | 9/2005 | Mack et al. |
| 2021/0324867 A1 | | 10/2021 | Perisho et al. |

OTHER PUBLICATIONS

International Search Report and Written Opinion dated Feb. 2, 2023 issued in PCT/US2022/047759.

* cited by examiner

*Primary Examiner* — Greg Binda
(74) *Attorney, Agent, or Firm* — Conley Rose, P.C.

(57) ABSTRACT

The mechanical shaft lock can include one or more shear pins. When an end of the shear pin, e.g., shear pin head, lines up with one or more shearing slots on the MSL or pump shaft, the shear pin engages and stops the rotation of the pump shaft and motor attached to the pump. The shaft lock can be engaged for installing an ESP, disengaged for production after installing by breaking the shear pin upon start-up, and re-engaged for removing the ESP from the wellbore. In some embodiments, the MSL may be configured to be disengaged and re-engaged to deal with well kicks.

4 Claims, 9 Drawing Sheets

Prior Art Pump Module

SYSTEM AND METHOD FOR A MECHANICAL SHAFT LOCK ON AN ELECTRIC SUBMERSIBLE PUMP

CROSS REFERENCE TO RELATED APPLICATIONS

This application claims priority to U.S. Provisional Application No. 63/271,293, filed Oct. 25, 2021, the contents of which are incorporated herein in their entirety.

This application relates to U.S. patent application Ser. No. 16/780,089, filed Feb. 3, 2020, now U.S. Pat. No. 10,822,933, which is a continuation of U.S. patent application Ser. No. 16/282,831, filed Feb. 22, 2019, now U.S. Pat. No. 10,584,566 the contents of which are incorporated herein in their entirety.

FIELD OF DISCLOSURE

The present disclosure relates to a mechanical shaft lock (MSL) configured to stop the rotation of a motor of an electric submersible pump.

BACKGROUND

Electric Submersible Pumps (ESP) are widely used in the production of fluid from oil and gas wells. Traditional ESPs have a centrifugal pump coupled to an electric motor which drives the pump to lift fluids to the surface. In certain conditions, such as a wellbore kick, it is possible that the fluid from the kick can flow thru the pump and cause it to spin which would in turn cause the motor to spin. In this situation, the motor would act like a generator and the resulting electric power generated would be transferred to the surface via the power cable leading to damaged equipment or potentially harming personnel.

What is needed are systems and methods to better control the ESP during initial installation, operation, and pulling of the unit from the well—particularly when anomalies such as well kicks are possible. Advantageously, the presently disclosed systems and methods solve these issues and may have other advantages as well.

SUMMARY OF THE DISCLOSURE

Aspects of the disclosed embodiments include one or more shear pins and a system for an MSL configured to lock an electric submersible pump an not allow it to rotate freely.

Embodiments of the present disclosure provide a mechanical shaft lock configured to stop the rotation of a motor in an electric submersible pump. In one specific embodiment, a mechanical shaft lock is configured to stop a rotation of a shaft in an electric submersible pump. The mechanical shaft lock comprises: a mechanical shaft lock shaft configured to be operably connected to a shaft on the electrical submersible pump; at least one shear pin; a mechanical shaft lock shaft; and at least one mechanical shaft lock shearing slot located on the mechanical shaft lock shaft. The at least one shear pin is configured to engage or disengage with the at least one mechanical shaft lock shearing slot such that when the at least one shear pin is disengaged from the mechanical lock shaft slot the mechanical shaft lock shaft can rotate. When the at least one shear pin is engaged with the mechanical shaft lock shaft slot the mechanical shaft lock shaft is prohibited from rotating. The mechanical shaft lock comprises an upper end and a lower end and the mechanical shaft lock is configured to be attached to a pump head on the upper end and a pump on the lower end. Other embodiments relate to systems and processes employing the MSL.

Further features of the disclosed systems and methods, and the advantages offered thereby, are explained in greater detail hereinafter with reference to specific example embodiments illustrated in the accompanying drawings.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION

Exemplary embodiments of the invention will now be described in order to illustrate various features of the invention. The embodiments described herein are not intended to be limiting as to the scope of the invention, but rather are intended to provide examples of the components, use, and operation of the invention.

Furthermore, the described features, advantages, and characteristics of the embodiments may be combined in any suitable manner. One skilled in the relevant art will recognize that the embodiments may be practiced without one or more of the specific features or advantages of an embodiment. In other instances, additional features and advantages may be recognized in certain embodiments that may not be present in all embodiments.

The Figures illustrate the architecture, functionality, and operation of possible implementations of systems and methods according to various embodiments of the present invention. In this regard, each block in the flowchart or block diagrams may represent a module, segment, or portion of instructions, which comprises one or more executable instructions for implementing the specified function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by in a variety of ways in addition to those described specifically herein.

The numerals in the figures are as follows:
17→MSL Housing; 18→MSL Shaft; 21→Set Screw; 22→Spring; 23→Shear Pin; 24→shear pin head; 25→MSL Shearing slot; 30 main spring surrounding shaft.

The embodiments describe a mechanical shaft lock (MSL). The MSL can be used to stop the rotation of the ESP's pump shaft and the motor connected to the pump during installation (or removal) of the ESP system and/or upon observing a kick or otherwise significant change in pressure within the wellbore. Thus, the MSL may assist in preventing the motor from generating unwanted voltage due to motor rotation from excess fluid in the pump during installation, during a well kick, and/or while running in hole (installation) or pulling out of hole. That is, the MSL may engage, i.e., lock, to prevent the ESP pump shaft and the connected motor from rotating while in the well. In this manner, while the pump shaft is locked the production tubing may fill with fluid and the pressure may equalize with the annulus surrounding the drill string without producing unwanted voltage. In some embodiments, the MSL may be configured to disengage, i.e., unlock, to allow for rotation when desired. That is, the MSL may be disengaged when installation is complete so that the shaft rotates. In some embodiments, the MSL may be engaged due to a kick or other event and subsequently disengaged when pressures have substantially equalized.

The MSL provides an efficient and cost-effective solution to preventing motor rotation during, for example, installation and removal of an ESP or other type of system in need of such a device.

Advantageously, the MSL will unlock upon the ESP system start after installation and will remain unlocked during ESP operation. The flow area through the MSL will vary depending upon the specific tubing, ESP, and other factors. In some embodiments, the flow area through the MSL is equivalent to that of 2⅞" of the tubing internal area. Thus, the MSL will not choke the flow of fluids. In some exemplary embodiments, the MSL could be "reset", i.e., re-locked after installation and use while unlocked. Once in the reset or re-locked position, the MSL will eliminate the ESP from turning while fluid falls back as the unit is pulled.

Figure 1:
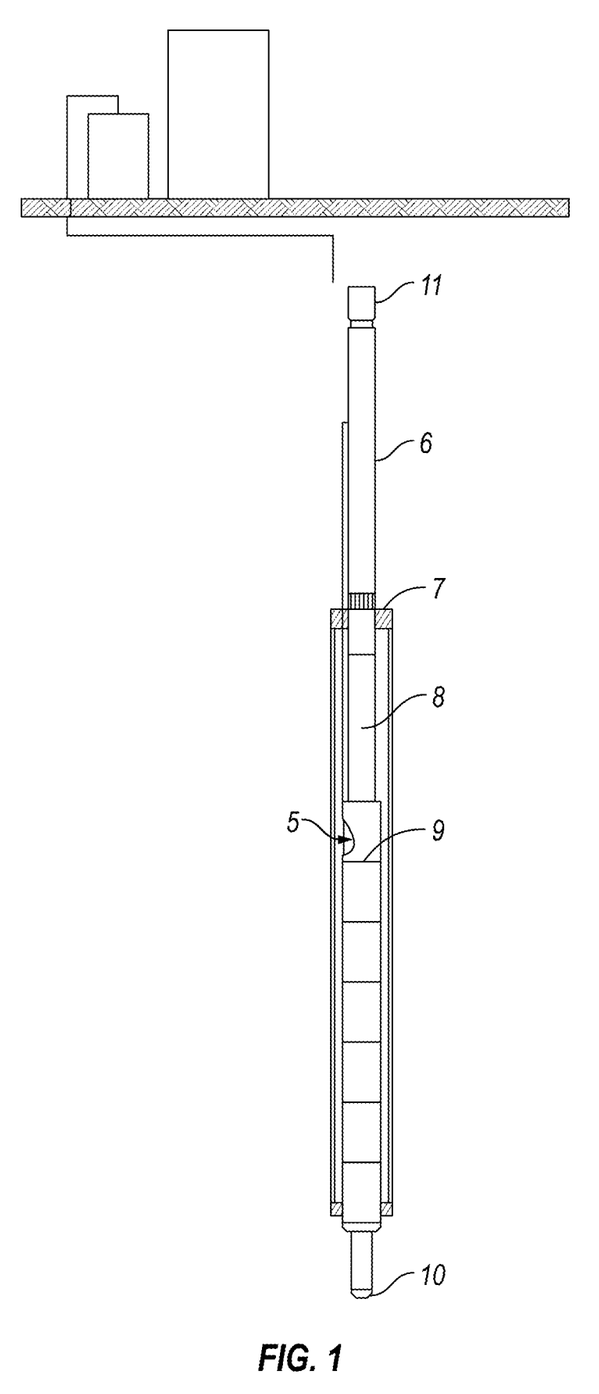
FIG. 1 illustrates an electric submersible pump (ESP) assembly wherein an MSL could be located between bolt-on head 11 and pump module 6 according to an exemplary embodiment.

FIG. 1 illustrates a block diagram of an electric submersible pump (ESP). The exemplary ESP comprises at least one centrifugal pump module 6 below a bolt-on head 11, a gas separator 7, a seal section 8, an electric motor 9 with an active cooling system, and a downhole sensor unit 10. In operation, a motor generates torque, which is communicated through a motor shaft into a seal section shaft. The seal section shaft transmits torque up to the gas separator shaft, which transmits torque to the pump module. The pump module utilizes the motor generated torque to lift wellbore fluid up a well bore. A mechanical shaft lock can be located between pump module 6 and bolt-on head 11 in one embodiment. In other embodiments, the MSL may be located above a bolt-on head 11. It should be understood that while FIG. 1 illustrates a shrouded motor many ESP systems are not shrouded. Representative mechanical shaft lock embodiments are discussed with further reference to FIGS. 2B, 3A, 3B, 3C, and 3D below.

Figure 2A:
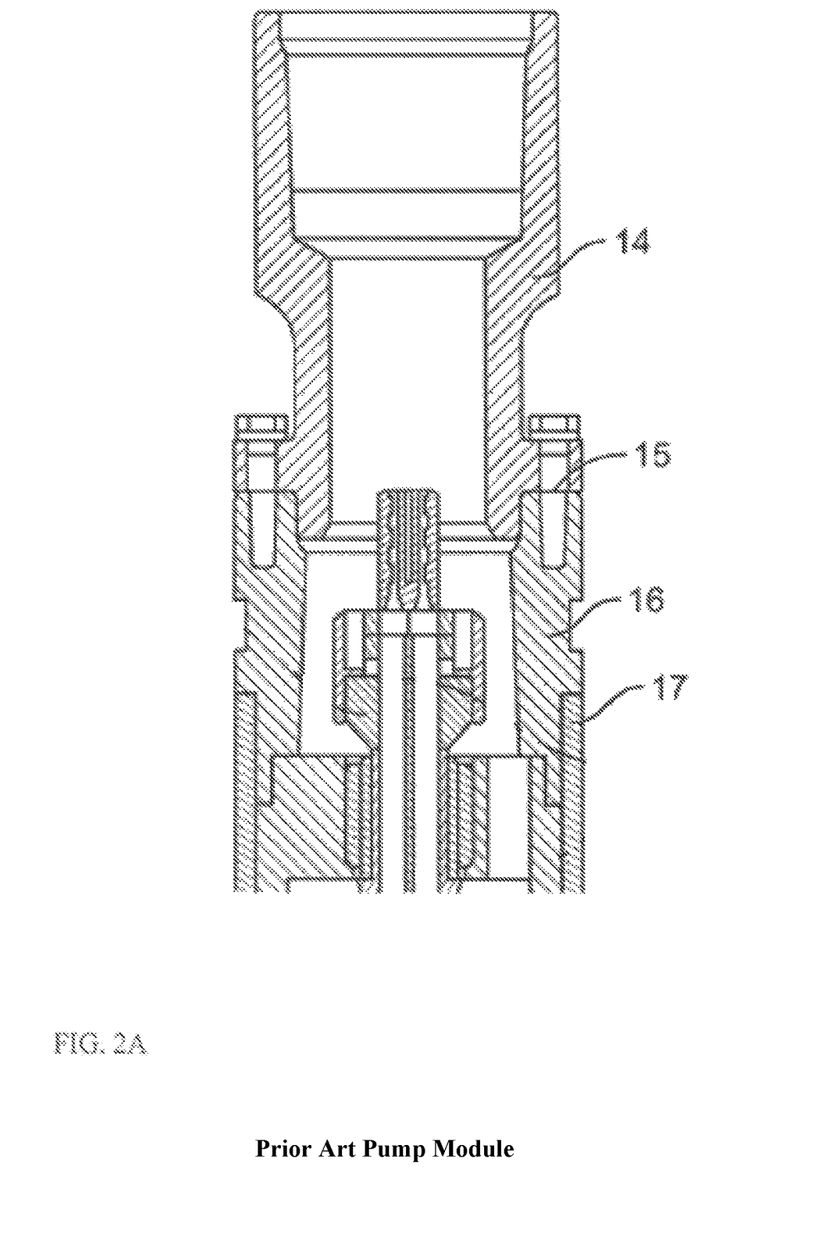
FIG. 2A is a diagram illustrating a prior art pump module.

FIG. 2A is a block diagram illustrating a cross-sectional perspective. A pump system may have a discharge head 14 which may also be referred to as a bolt-on head such as 11 in FIG. 1. The discharge head 14 may be integral to the pump module 6 or be attached by any of a variety of suitable techniques as known in the art. The discharge head 14 may be connected via a flange to the pump head 16 using a flange or flangeless connection. In some embodiments, the discharge head 14 will be connected to the pump head 16 using corrosion resistant fasteners 15 such as, for example, screws.

Figure 2B:
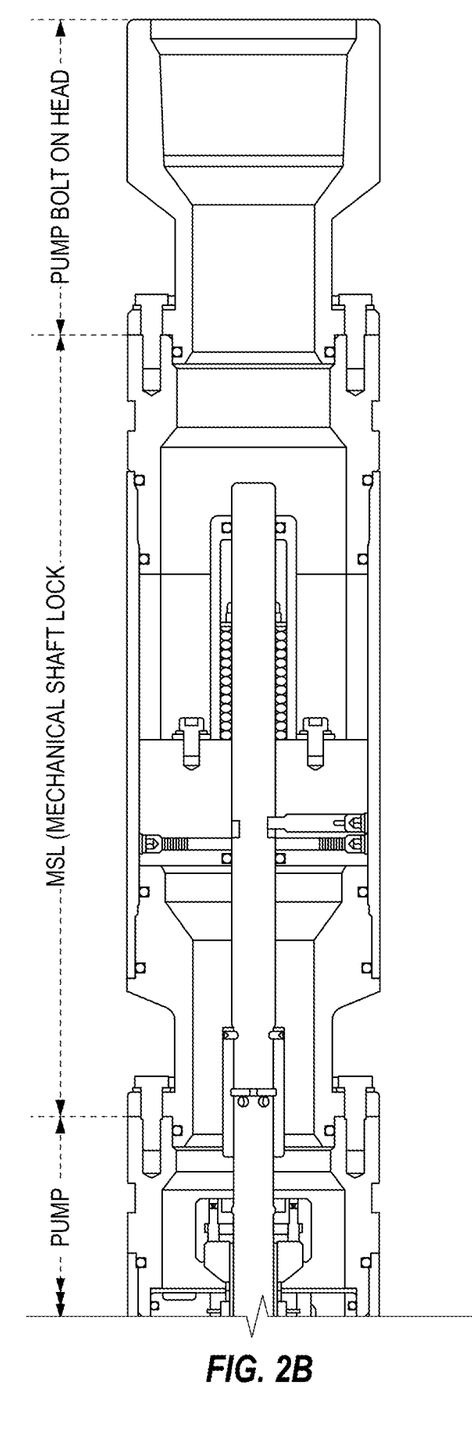
FIG. 2B is a diagram illustrating a mechanical shaft lock within a pump module according to an exemplary embodiment.

FIG. 2B shows a block diagram of an exploded view of a mechanical shaft lock between the pump module and pump bolt-on head. If desired, the MSL could be placed above the pump bolt-on head. As shown in FIG. 2B the mechanical shaft lock is typically attached in a convenient manner to the bolt-on head on the uphole or upper portion and a pump on the downhole or lower portion. The mechanical shaft lock is configured such that it does not substantially interfere with the production of well fluids by the associated pump. While the mechanical shaft lock is shown in FIG. 2B as attached to the pump head and pump with bolts it should be understood that the mechanical shaft lock may be attached with any type of fastener, flange, or flangeless connection so long as the mechanical shaft lock is adequately secured for the environment in which it will be utilized.

Figure 3A:
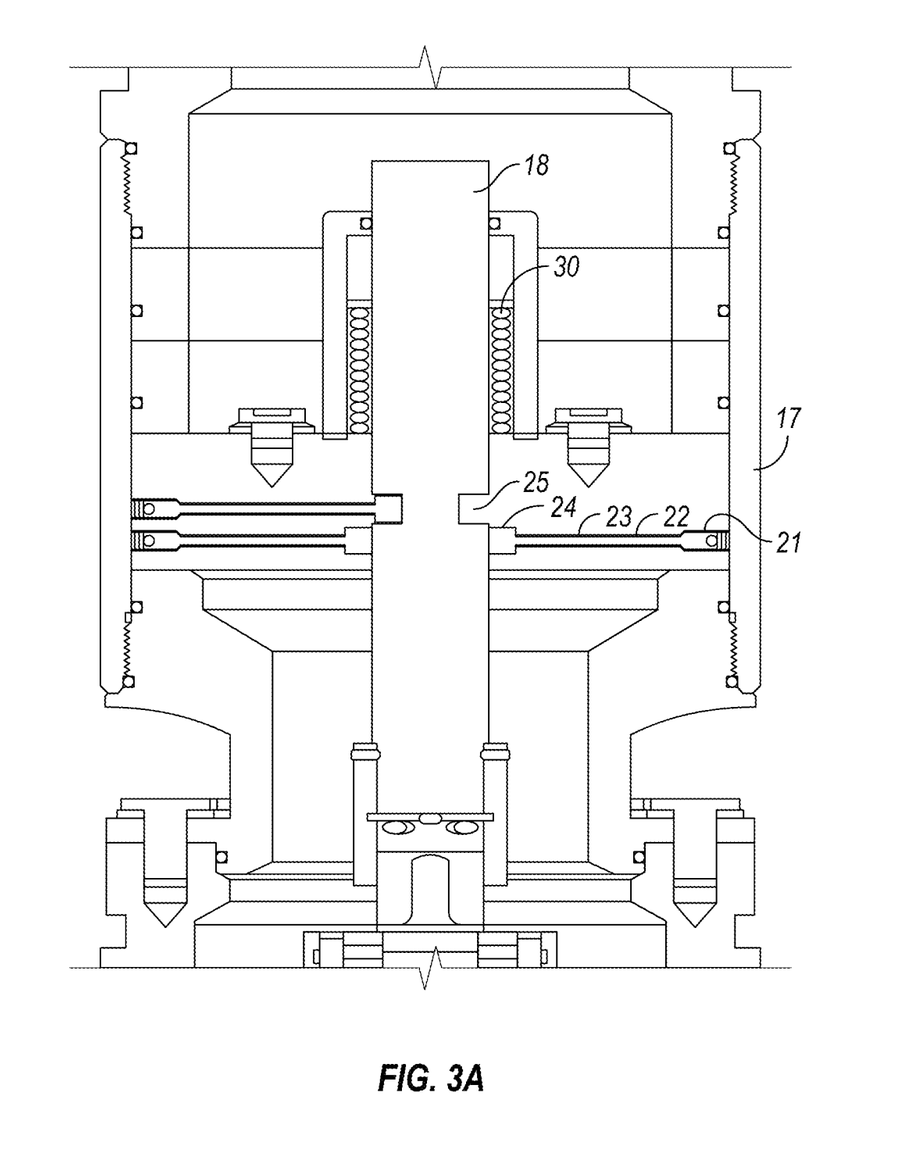
FIG. 3A is a diagram illustrating a mechanical shaft lock (MSL) in a locked position while an ESP assembly is running in hole (ROH) during installation according to an exemplary embodiment.
Figure 3B:
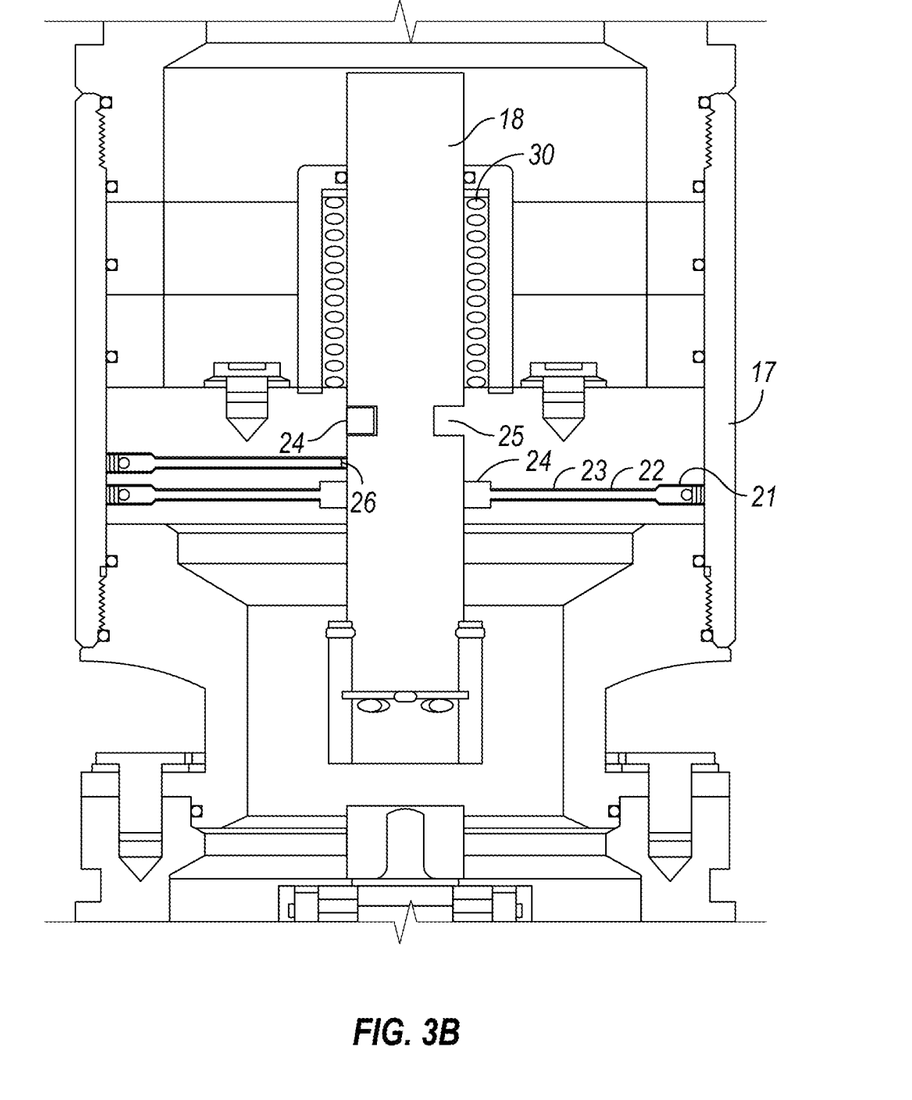
FIG. 3B is a diagram illustrating a mechanical shaft lock (MSL) disengaged, i.e., unlocked for production according to an exemplary embodiment.
Figure 3C:
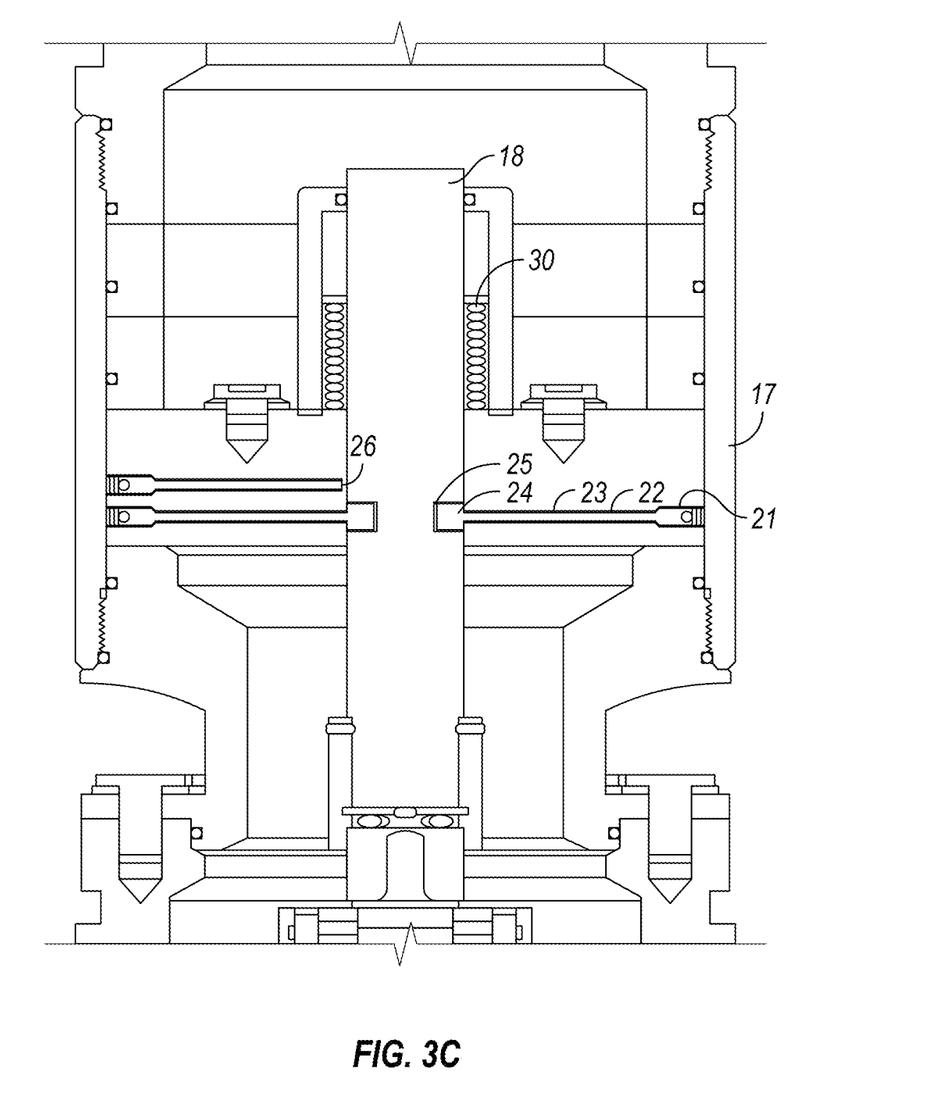
FIG. 3C is a diagram illustrating a mechanical shaft lock (MSL) in a locked position while an ESP assembly is being pulled from a wellbore according to an exemplary embodiment.

FIGS. 3A, 3B, 3C, and 3D are block diagrams illustrating a mechanical shaft lock (MSL) in various positions. FIG. 3A illustrates the MSL in a locked position while an ESP is running in hole (RIH) during installation. For example, while RIH with the ESP assembly the well may experience a kick and thereby the rotation of the pump will not be allowed because the MSL is engaged. FIG. 3B illustrates the MSL disengaged, i.e., unlocked for production. The MSL is disengaged by starting the pump which breaks the shear pin from the shear pin head allowing the MSL shaft to disengage from the pump shaft. FIG. 3C illustrates the MSL re-engaged, i.e., locked during pulling of an ESP from the wellbore.

The MSL can include one or more shear pins, each shear pin comprising a long body located perpendicular to the pump shaft. The shear pin in some embodiments has a head facing the MSL shaft wherein the head is configured to fit into a shearing slot located on the shaft. At the other end of the shear pin, the shear pin may be connected to an actuator such as a spring. The pump shaft comprises the one or more shearing slots which are slightly bigger than the head of the shear pin such that the shear pin head can engage with the shearing slot so that the motor can no longer rotate. When the shearing slot and head of the shear pin align, the actuator, e.g., spring, will push the shear pin and attached head into the shearing slot.

The shear pin is configured so that when the pump shaft is moved with sufficient force, the head of the shear pin can break off from the remaining shear pin portion, resulting in the motor being able to rotate once again. The manner in which this is accomplished may vary depending upon the desired force to accomplished the shearing and the other ESP components among other factors. For example, one may select the material of the shear pin and shear pin head which is integral such that the head breaks from the shear pin when the desired force is applied. That is, one may employ a softer or harder metal as desired so that the shear pin breaks at or near the desired force. In some embodiments, the shear pin is comprised of a brass. In another embodiment, the shear pin and associated head may be made such that the associated head has a perforation like a machined groove such that the head breaks at the perforation when subjected to the desired force. For example, a carbon steel shear pin could be made with a groove at the associated head of the shear pin. In this manner when the pump shaft is moved with enough force, the head can break off from the shear pin at the perforation, e.g., groove, resulting in the pump shaft and associated motor being able to rotate again. In other embodiments, the perforation may be replaced by a weak point at the shear pin head comprising a brittle or easily breakable section of the shear pin. By breaking the shear pin off at the brittle point, the pump shaft is released and the pump shaft and associated motor can turn.

FIGS. 3A, 3B, and 3C illustrate the section of the MSL shaft 18 in which the mechanical shaft lock can be located. The MSL can comprise a shear pin 23 located perpendicular to the MSL housing 17. On the wall-facing end of the shear pin 23 is the set screw 21. The set screw 21 can include any suitable manner of connecting the shear pin 23 securely to the MSL housing 17, including a screw. In some embodiments, the MSL housing 17 can have an attachment hole that can mate with an attachment connection such that the shear pin 23 is attached to the MSL housing 17. The set screw 21 can protrude perpendicular to the wall of the MSL housing 17. Connecting one end of the shear pin 23 to the set screw 21 can be a spring 22. The end of the shear pin 23 not attached to the spring 22 can have a shear pin head 24 that can engage with one or more, preferably one, MSL shearing slot 25. While FIGS. 3A-3C show the shear pin head 24 larger than the shear pin 23, it should be understood that the shear pin head 24 may be smaller or even the same size as the shear pin 23 so long as the shear pin may engage the shearing slot 25 and stop rotation as described below and so that the shear pin head is sheared upon starting the pump.

The shearing slot 25 can be on the body of the MSL shaft 18. The shearing slot 25 can be configured to be slight bigger than the shear pin head 24 so that when the shearing slot 25 lines up with the shear pin head 24, the spring 22 unloads its force directed on the MSL shaft 18, pushing the shear pin 23 towards the MSL shaft 18. Thus, the shear pin head 24 engages with the shearing slot 25 and stops the rotation of the MSL shaft and associated pump shaft and motor. Unless the shear pin head 24 is lined up with the shearing slot 25, the shear pin 24 will remain against the MSL shaft 18 with the spring 22 being compressed.

Figure 3D:
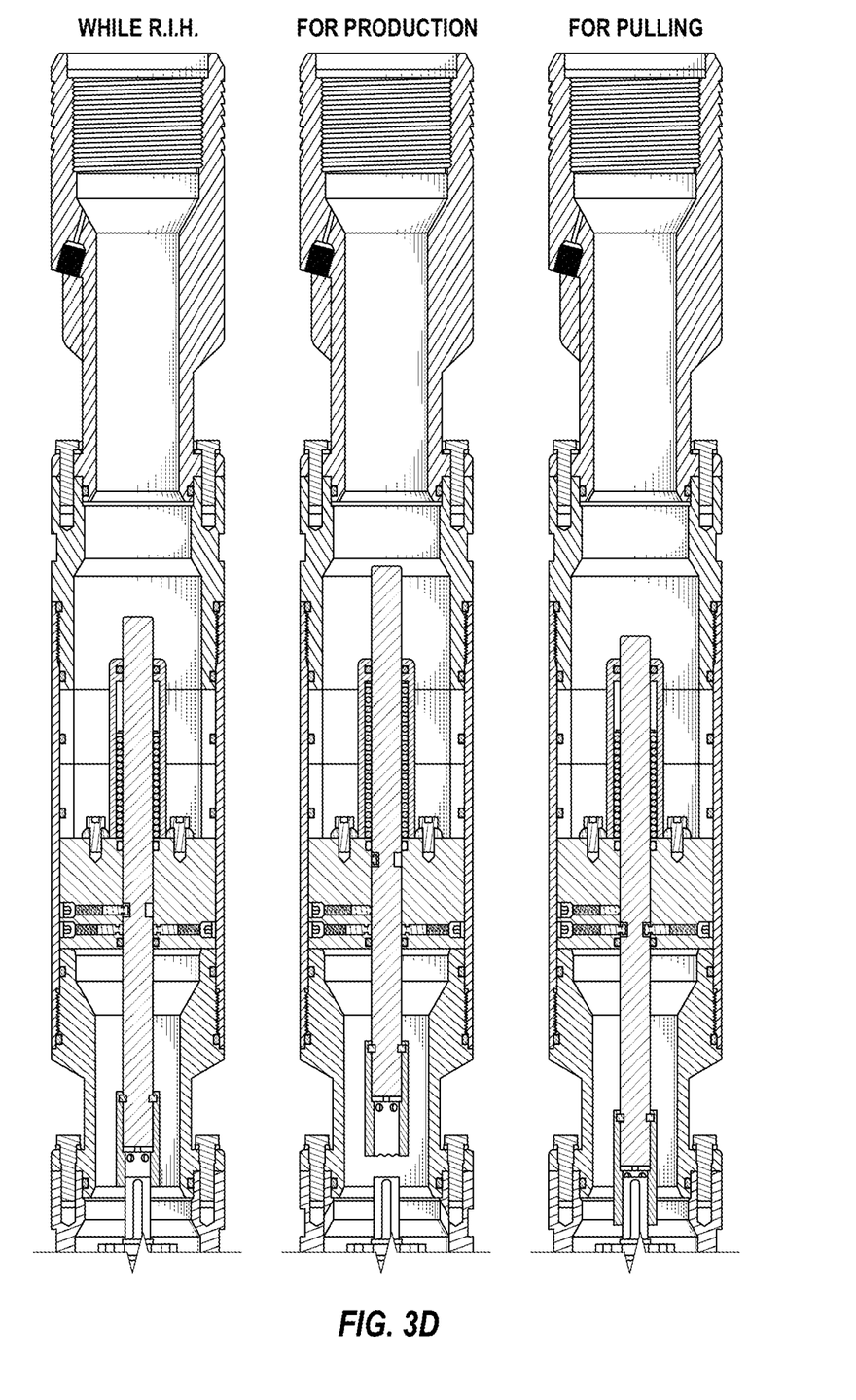
FIG. 3D is a diagram illustrating a mechanical shaft lock (MSL) in the three positions it is intended to be working while operating with an ESP such as one with a permanent magnet motor.

In an exemplary embodiment, each MSL can be comprised of multiple shear pin 23 and associated head 24. While there also may be multiple shearing slot 25 on the MSL shaft 18, in some embodiments there is only one shearing slot 25. That is, the same shearing slot 25 may be used multiple times with multiple shear pin 23 and associated head 24 because a head 24 that has been sheared will disassociate and not remain lodged in the shearing slot 25. As shown in FIG. 3D, the shearing slot 25 on the MSL shaft changes position within the MSL depending on which operation/phase is occurring of the three primary ESP operations/phases (R.I.H. or installing in which the MSL is locked, production in which the MSL is unlocked, and "pulling" or removing in which the MSL is locked). The MSL shaft changes position due to the force of the spring 30 surrounding the shaft as shown in FIGS. 3A-C. In some embodiments the spring 30 abuts a stop ring surrounding the shaft on the top of the spring. If desired, the spring 30 may be encompassed in a shroud or other protective covering to prevent sand or other materials from interfering with the operation of the spring 30. In a preferred embodiment, one shear pin is engaged during RIH and then sheared upon start-up of the ESP for production. Once sheared, the spring 30 pushes the MSL into an upper position. A second shear pin is configured to engage when the spring is pushed down for removal of the ESP from the wellbore. Typically, wireline is employed to push the spring 30 down for ESP removal. Of course, if desired additional shear pins may be used for additional engagement and disengagement. If desired, some automated, hydraulic, or other means of actuation may be employed to push spring 30 down to engage another shear pin.

Having multiple shear pin 23 and associated head 24 can ensure a greater likelihood of stopping the rotation of the motor. Furthermore, having multiple shear pin 23 and associated head 24 and/or multiple shearing slot 25 can ensure that, once the MSL has been already used a first time, it can be released and potentially engaged a second, third, or fourth time depending upon the number of shear pin 23 and associated head 24 that are employed. In this manner, after locking the MSL may be disengaged from the MSL shaft 18 and the motor 9 can turn upon application of sufficient force to break the shear pin. And if the user wants the motor to stop once again—for example, if the user wants to pull the ESP from the wellbore or another kick occurs—the MSL can be engaged yet again. For example, as shown in FIG. 3C, two shear pins 23 may engage with corresponding MSL shearing slots 25 on the MSL shaft 18, even though another shear pin 23 has already been broken off.

EMBODIMENTS

With reference to FIGS. 2B and 3A to 3D the following embodiments are disclosed.

1. A mechanical shaft lock configured to stop a rotation of a shaft in an electric submersible pump, the mechanical shaft lock comprising:
   a mechanical shaft lock shaft 18 configured to be operably connected to a shaft on the electrical submersible pump;
   at least one shear pin 23;
   a mechanical shaft lock spring 22 surrounding the mechanical shaft lock shaft; and
   at least one mechanical shaft lock shearing slot 25 located on the mechanical shaft lock shaft 18;
   wherein the at least one shear pin 23 is configured to engage or disengage with the at least one mechanical shaft lock shearing slot 25 such that when the at least one shear pin 23 is disengaged from the mechanical lock shaft slot the mechanical shaft lock shaft can rotate and when the at least one shear pin 23 is engaged with the mechanical shaft lock shaft slot the mechanical shaft lock shaft is prohibited from rotating; and
   wherein the mechanical shaft lock comprises an upper end and a lower end and wherein the mechanical shaft lock is configured to be attached to a pump head 16 on the upper end and a pump on the lower end.

Figure 3E:
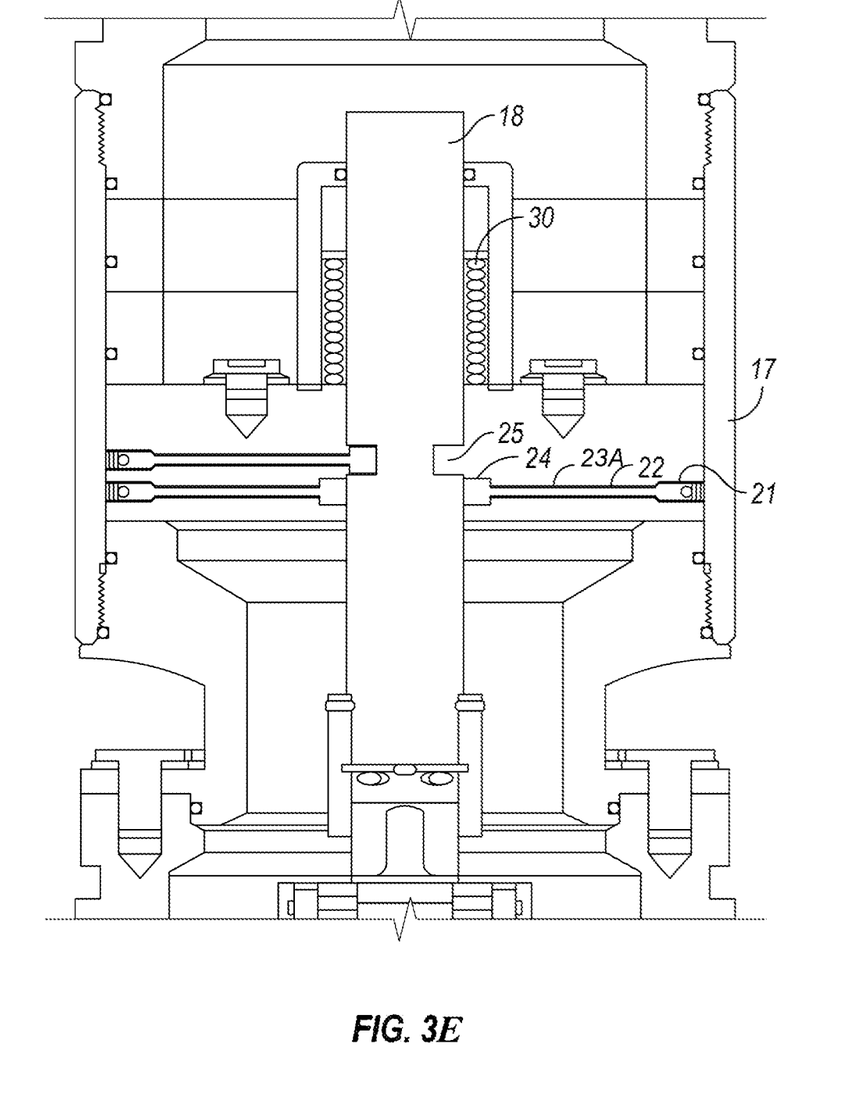
FIG. 3E is a diagram illustrating a mechanical shaft lock (MSL) in the three positions it is intended to be working while operating with an ESP such as one with a permanent magnet motor.

2. The mechanical shaft lock of any preceding embodiment, wherein the shear pin 23A in FIG. 3E is comprised of a material such that when a shear pin 23A is engaged with the mechanical shaft lock shaft slot and a sufficient force is applied, the shear pin 23A is sheared to allow the mechanical shaft lock shaft to rotate.

Figure 3F:
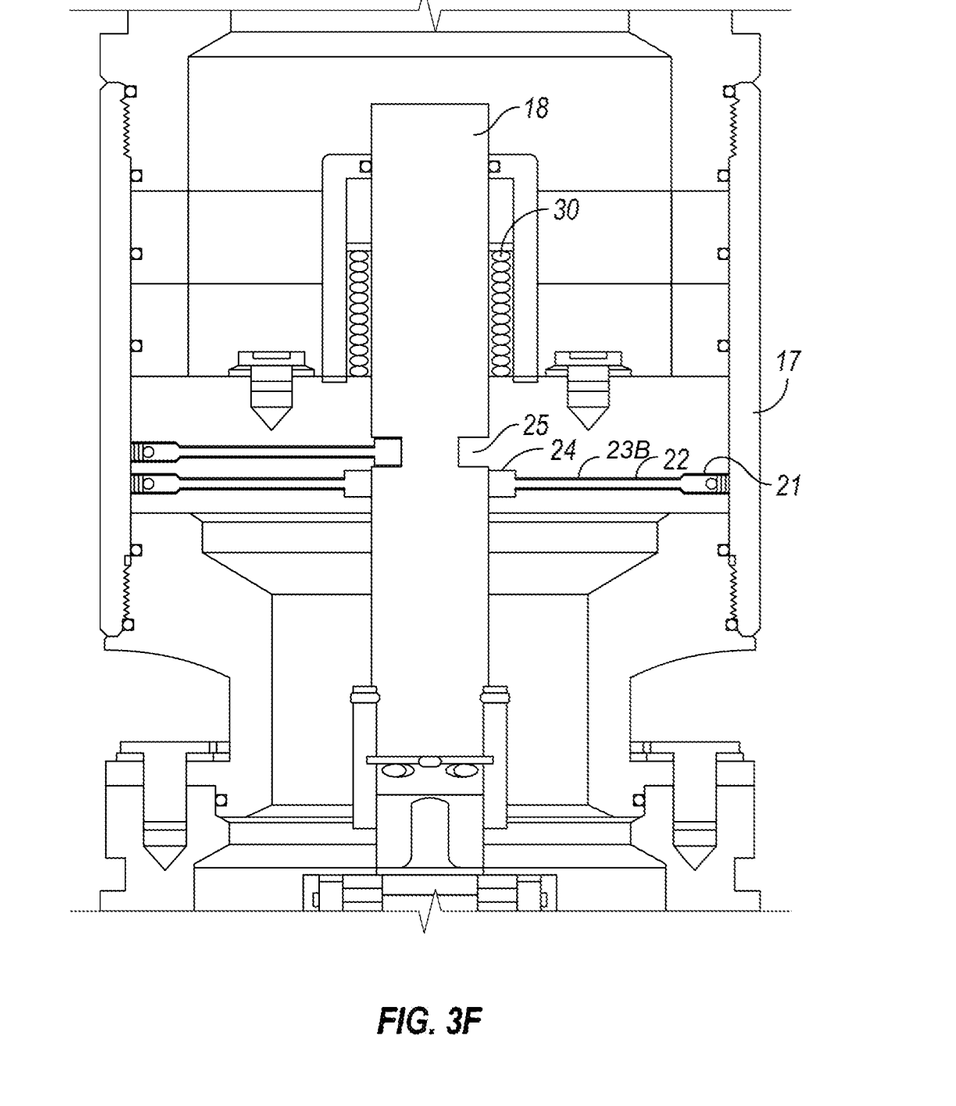
FIG. 3F is a diagram illustrating a mechanical shaft lock (MSL) in the three positions it is intended to be working while operating with an ESP such as one with a permanent magnet motor.

3. The mechanical shaft lock of any preceding embodiment, wherein the shear pin 23B in FIG. 3F comprises a shear pin head 24 and a weak point between the shear pin 23B and shear pin head 24 such that when a shear pin head 24 is engaged with the mechanical shaft lock shaft slot and a sufficient force is applied, the shear pin head 24 is sheared from the shear pin 23B to allow the mechanical shaft lock shaft to rotate.

4. A system for locking an electric submersible pump shaft to prevent rotation of the shaft, wherein the system comprises:
  an electric submersible pump shaft;
  a motor operably connected to the electric submersible pump shaft wherein the motor is configured to rotate the electric submersible pump shaft; and
  a mechanical shaft lock comprising:
    a mechanical shaft lock shaft configured to be operably connected to the electrical submersible pump shaft and the motor;
  at least one shear pin 23;
  a mechanical shaft lock spring 22 surrounding the mechanical lock shaft; and
  at least one mechanical shaft lock shearing slot 25 located on the mechanical shaft lock shaft 18;
  wherein the at least one shear pin 23 is configured to engage or disengage with the at least one mechanical shaft lock shearing slot 25 such that when the at least one shear pin 23 is disengaged from the mechanical lock shaft slot the mechanical shaft lock shaft can rotate and when the at least one shear pin 23 is engaged with the mechanical shaft lock shaft slot 25 the mechanical shaft lock shaft is prohibited from rotating; and
  wherein the mechanical shaft lock shaft is operably connected to the electric submersible pump shaft such that when the mechanical shaft lock shaft is prohibited from rotating the electric submersible pump shaft is prohibited from rotating.

5. A method for producing wellbore fluids using an electric submersible pump wherein the method comprises:
  installing an electric submersible pump into a well; and
  producing fluids from the well using the electric submersible pump;
  wherein the electric submersible pump comprises a mechanical shaft lock comprising:
  a mechanical shaft lock shaft configured to be operably connected to a shaft on the electrical submersible pump;
  at least one shear pin 23;
  a mechanical shaft lock spring 22 surrounding the mechanical lock shaft; and
  at least one mechanical shaft lock shearing slot 25 located on the mechanical shaft lock shaft 18;
  wherein the at least one shear pin 23 is configured to engage or disengage with the at least one mechanical shaft lock shearing slot 25 such that when the at least one shear pin 23 is disengaged from the mechanical lock shaft slot the mechanical shaft lock shaft can rotate and when the at least one shear pin 23 is engaged with the mechanical shaft lock shaft slot the mechanical shaft lock shaft is prohibited from rotating; and
  wherein the mechanical shaft lock comprises an upper end and a lower end and wherein the mechanical shaft lock is configured to be attached to a pump head on the upper end and a pump on the lower end.

Although embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes. The invention should therefore not be limited by the above described embodiments, method, and examples, but by all embodiments within the scope and spirit of the invention as claimed.

What is claimed is:

1. A mechanical shaft lock configured to stop a rotation of a shaft in an electric submersible pump, the mechanical shaft lock comprising:
  a mechanical shaft lock shaft configured to be operably connected to a shaft on the electrical submersible pump;
  at least one shear pin;
  a mechanical shaft lock spring surrounding the mechanical lock shaft; and
  at least one mechanical shaft lock shearing slot located on the mechanical shaft lock shaft;
  wherein the at least one shear pin is configured to engage or disengage with the at least one mechanical shaft lock shearing slot such that when the at least one shear pin is disengaged from the mechanical lock shaft slot the mechanical shaft lock shaft can rotate and when the at least one shear pin is engaged with the mechanical shaft lock shaft slot the mechanical shaft lock shaft is prohibited from rotating; and
  wherein the mechanical shaft lock comprises an upper end and a lower end and wherein the mechanical shaft lock is configured to be attached to a pump head on the upper end and a pump on the lower end.

2. The mechanical shaft lock of claim 1, wherein the shear pin is comprised of a material such that when the shear pin is engaged with the mechanical shaft lock shaft slot and a sufficient force is applied, the shear pin is sheared to allow the mechanical shaft lock shaft to rotate.

3. A method for producing wellbore fluids using an electric submersible pump wherein the method comprises:
  installing an electric submersible pump into a well; and
  producing fluids from the well using the electric submersible pump;
  wherein the electric submersible pump comprises a mechanical shaft lock comprising:
  a mechanical shaft lock shaft configured to be operably connected to a shaft on the electrical submersible pump;
  at least one shear pin;
  a mechanical shaft lock spring surrounding the mechanical lock shaft; and
  at least one mechanical shaft lock shearing slot located on the mechanical shaft lock shaft;
  wherein the at least one shear pin is configured to engage or disengage with the at least one mechanical shaft lock shearing slot such that when the at least one shear pin is disengaged from the mechanical lock shaft slot the mechanical shaft lock shaft can rotate and when the at least one shear pin is engaged with the mechanical shaft lock shaft slot the mechanical shaft lock shaft is prohibited from rotating; and
  wherein the mechanical shaft lock comprises an upper end and a lower end and wherein the mechanical shaft lock is configured to be attached to a pump bolt-on head on the upper end and a pump on the lower end.

4. The method of claim 3, wherein the shear pin is comprised of a material such that when the shear pin is engaged with the mechanical shaft lock shaft slot and a sufficient force is applied, the shear pin is sheared to allow the mechanical shaft lock shaft to rotate.

* * * * *